(12) United States Patent
Kobayashi

(10) Patent No.: US 8,980,450 B2
(45) Date of Patent: *Mar. 17, 2015

(54) LUBRICANT AND MAGNETIC DISK

(71) Applicant: MORESCO Corporation, Hyogo (JP)

(72) Inventor: Nagayoshi Kobayashi, Hyogo (JP)

(73) Assignee: MORESCO Corporation, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,390

(22) Filed: Jan. 30, 2014

(65) Prior Publication Data

US 2014/0147699 A1    May 29, 2014

Related U.S. Application Data

(62) Division of application No. 12/734,699, filed as application No. PCT/JP2008/071281 on Nov. 18, 2008, now Pat. No. 8,679,655.

(30) Foreign Application Priority Data

Nov. 19, 2007 (JP) .................. 2007-299451

(51) Int. Cl.
*G11B 5/66* (2006.01)
*G11B 5/725* (2006.01)
(Continued)

(52) U.S. Cl.
CPC .............. *G11B 5/725* (2013.01); *C08G 65/007* (2013.01); *C08G 2650/48* (2013.01); *C08L 71/02* (2013.01); *C10M 105/54* (2013.01); *C10M 107/38* (2013.01); *C10M 2211/0425* (2013.01); *C10M 2213/043* (2013.01); *C10M 2213/0606* (2013.01); *C10N 2220/021* (2013.01); *C10N 2230/06* (2013.01); *C10N 2230/10* (2013.01); *C10N 2240/204* (2013.01); *C10N 2250/121* (2013.01)
USPC ....................................... 428/835.8; 508/582

(58) Field of Classification Search
USPC ....................................... 508/582; 428/835.8
See application file for complete search history.

(56) References Cited

U.S. PATENT DOCUMENTS 5,512,373 A     4/1996  Ueda et al.
2005/0282045 A1   12/2005  Sonoda

FOREIGN PATENT DOCUMENTS

JP    61-99926    5/1986
JP    6-318319    11/1994
(Continued)

OTHER PUBLICATIONS

Tani et al., "Lubricant pick-up of ultra-thin PFPE lubricants with different backbone structures", IEEE Trans Magn, vol. 47, No. 7, Jul. 2011, pp. 1837-1841.*

(Continued)

*Primary Examiner* — Holly Rickman
(74) *Attorney, Agent, or Firm* — Wenderoth, Lind & Ponack, L.L.P.

(57) ABSTRACT

A lubricant containing a compound (A) comprising a perfluoropolyether having a main-chain structure of the formula (1) and having a polar group at each of opposite terminals thereof, and a compound (B) comprising a perfluoropolyether having a main-chain structure of the formula (1) and having a nonpolar group at at least one terminal thereof $$-(CF_2CF_2CF_2O)_a- \quad (1)$$

wherein a is a real number of 5 to 30.

1 Claim, 1 Drawing Sheet

(51) Int. Cl.
*C08G 65/00* (2006.01)
*C08L 71/02* (2006.01)
*C10M 105/54* (2006.01)
*C10M 107/38* (2006.01)

(56) References Cited

FOREIGN PATENT DOCUMENTS

| JP | 8-63739 | 3/1996 |
| JP | 10-149527 | 6/1998 |
| JP | 11-60720 | 3/1999 |
| JP | 11-131083 | 5/1999 |
| JP | 2005-63484 | 3/2005 |
| JP | 2005-122790 | 5/2005 |

OTHER PUBLICATIONS

International Search Report issued Jan. 13, 2009 in Internation (PCT) Application No. PCT/JP2008/071281.
Kasai, P., "Perfluoropolyethers: Intramolecular Disproportionation," Macromolecules, May 1992, vol. 25, pp. 6791-6799.
English machine translation of JP 10-149527, Kobayashi et al., Japan, Feb. 1998.

* cited by examiner

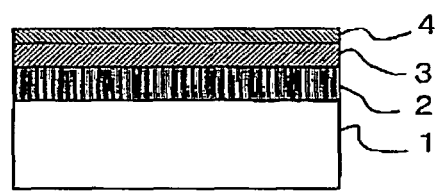

LUBRICANT AND MAGNETIC DISK

TECHNICAL FIELD

The present invention relates to lubricants and magnetic disks having the lubricant applied thereto, and more particularly to lubricants having excellent resistance to decomposition.

BACKGROUND ART

With increases in the recording capacity of magnetic disk devices, the distance between the magnetic disk serving as a recording medium and the head for recording information or playback becomes almost nil close to contact therebetween. Disks are rotated also at increased speeds, so that the contact between the disk and the head tends to produce an ever increasing impact.

To reduce the impact of contact, efforts have been made to provide carbon protective films which are appropriate in surface roughness and strength and lubricant films having an appropriate thickness and to ensure a proper composition ratio between the bonded layer and the mobile layer. Especially the lubricant film which is positioned on the outermost surface of the disk needs to satisfy requirements which include, besides the reduction of impact of contact, prevention of the contamination of the disk surface and prevention of transfer of the film to the head. In addition to the thickness of the lubricant film and the composition ratio between the bonded layer and the mobile layer, therefore, also important is the design of the chemical structure of the lubricant.

The lubricants generally in use are perfluoropolyethers having functional groups. Examples of functional groups are hydroxyl, amino and cyclophosphazene group. The monomer units providing the main chain of perfluoropolyether include, for example, $CF_2O$, $CF_2CF_2O$, $CF(CF_3)CF_2O$ and $CF_2CF_2CF_2O$. Homopolymers or copolymers of such units provide main chains of perfluoropolyethers.

Fomblin ZTETRAOL of the formula (2) is available as a lubricant comprising a compound having a main-chain structure of $CF_2O$. This lubricant exhibits good properties to adhere to the disk due to the presence of hydroxyl at opposite terminals of the molecule, but the $CF_2O$ portion providing the main chain is low in resistance to Lewis acids, reacts with $Al_2O_3$ in the component of the head and becomes cleaved in its main chain (see, for example, Nonpatent Literature 1). When this cleavage progresses, the compound becomes lower in molecular weight, eventually vaporizing off from the magnetic disk surface and failing to retain the form of a lubricant film in systems involving contact or sliding movement between the head and disk

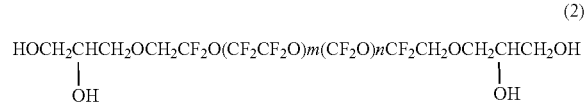

(2)

wherein m and n are each a real number of 10 to 40.

On the other, lubricants of the formula (3) or formula (4) are available as lubricants comprising a compound wherein the main-chain structure has $CF_2CF_2CF_2O$ only. These lubricants are less likely to decompose even in the presence of Lewis acids, affording magnetic disks of improved durability when applied as a lubricant layer (see, for example, Patent Literatures 1 and 2).

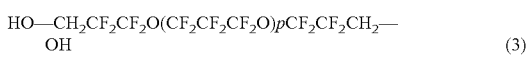

(3)

wherein p is an integer, and the lubricants are 800 to 5000 in number average molecular weight

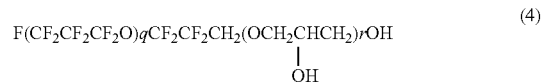

(4)

wherein q is an integer, r is an integer of 1 to 5, and the lubricants are 500 to 4000 in number average molecular weight.

With recent trends toward low flying-heads and high-speed disk rotation, it is required that the lubricant to be positioned on the outermost disk surface be prevented from spattering and decomposition that would lead to the disappearance of the lubricant layer and exhibit mobility for diminishing the frictional force that will result from the contact of the head with the disk so as to give improved durability to the disk.

However, when used singly, the compound (3) or compound (4) of the above-mentioned Patent Literatures 1 and 2 was unable to give improved durability to disks as will be apparent from Experimental Example 1 given later.

[Nonpatent Literature 1] Macromolecules, 1992, Vol. 25, p. 6791-6799
[Patent Literature 1] JP 1996-63739 A
[Patent Literature 2] JP 1998-149527 A An object of the present invention is to provide a lubricant which is excellent in both adhesion and mobility and outstanding in durability when used for high-speed rotation disks and low-flying heads, and to provide magnetic disks having the lubricant applied thereto.

DISCLOSURE OF THE INVENTION

The present invention provides the invention to be described below.

1. A lubricant characterized in that the lubricant contains a compound (A) comprising a perfluoropolyether having a main-chain structure of the formula (1) and having a polar group at each of opposite terminals thereof, and a compound (B) comprising a perfluoropolyether having a main-chain structure of the formula (1) and having a nonpolar group at at least one terminal thereof

(1)

wherein a is a real number of 5 to 30.

2. A lubricant as defined above wherein the compound (A) is a compound having at least three hydroxyl groups.
3. A lubricant as defined above wherein the compound (A) is a compound having at least four hydroxyl groups.
4. A lubricant as defined above wherein the compound (B) is a compound having a nonpolar group at one terminal thereof and at least two hydroxyl groups at the other terminal thereof.
5. A magnetic disk having at least a recording layer and a protective layer formed on a substrate, and a lubricant layer over a surface thereof, the magnetic disk being characterized in that the lubricant layer comprises a lubricant as defined above.
6. A magnetic disk having at least a recording layer and a protective layer formed on a substrate, and a lubricant layer over a surface thereof, the magnetic disk being characterized in that the lubricant layer comprises a lubricant layer of a compound (A) and a lubricant layer of a compound (B).
7. A magnetic disk as defined above wherein the compound (A) is a compound having at least three hydroxyl groups.

8. A magnetic disk as defined above wherein the compound (B) is a compound having a nonpolar group at one terminal thereof and at least two hydroxyl groups at the other terminal thereof.

In order to obtain lubricants exhibiting high durability when used for high-speed rotation disks and low-flying heads, compounds are selected from a group of lubricants having high resistance to decomposition. The lubricants highly resistant to decomposition are preferably perfluoropolyethers having a main-chain structure of the formula (1). Selected from this group of lubricants are a compound excellent in adhesion to disks and having a polar group at each of opposite terminals thereof, and a perfluoropolyether compound excellent in mobility on disks and having a nonpolar group at at least one terminal thereof. A lubricant layer comprising these two types of compounds is formed on a magnetic disk

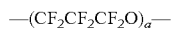

wherein a is a real number of 5 to 30.

[1] Lubricants

[1-1] Structure and Composition of Lubricants

In the case of compounds (A) having a polar group at each of opposite terminals of the molecule, examples of polar groups are hydroxyl, carboxyl, amino and ester groups, among which hydroxyl is preferred. Furthermore, the compound preferably has at least three hydroxyl groups, more preferably at least four hydroxyl groups, to prevent the lubricant from scattering and enable the lubricant to firmly adhere to the disk surface. The compound is 1000 to 5000, more preferably 1500 to 4000, in average molecular weight. Examples of such compounds are those of the following formula (5)

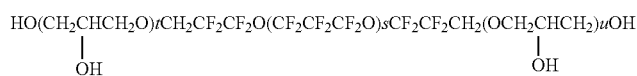

wherein s is a real number of 5 to 30, and t and u are each a real number of 0 to 3.

The perfluoropolyether compound (B) having a nonpolar group at at least one terminal of the molecule can be a compound having $CF_3$ as the nonpolar group. Preferable are compounds which have a polar group, such as hydroxyl, carboxyl, amino or ester group, among which hydroxyl is preferred, at the other terminal. For the lubricant to exhibit suitable mobility with a reduced likelihood of scattering despite the high-speed rotation of the disk, the compound preferably has $CF_3$ at one terminal and at least two hydroxyl groups at the other terminal. The compound is 1000 to 5000, preferably 1500 to 4000, in average molecular weight. Examples of such compounds are those of the following formula (6)

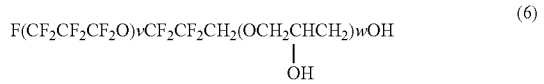

wherein v is a real number of 5 to 30, and w is a real number of 0 to 3.

[1-2] Use of Lubricants

The lubricant composition of the present invention is useful, for example, as a lubricant for giving improved sliding characteristics to the magnetic disks inside magnetic disk devices. The lubricant composition of the invention is excellent in decomposition resistance and provides satisfactory interaction with carbon protective films. Accordingly, the composition is applicable not only to magnetic disks but also to photomagnetic recording devices or magnetic tapes having a carbon protective film, to surface protective films of plastics or like organic materials, and to surface protective films of inorganic materials such as $Si_3N_4$, SiC, $SiO_2$ and the like. Especially, the composition is applicable to surfaces of which lubricity durability is required.

[2] Concerning Magnetic Disks

[2-1] Structure of Magnetic Disks

FIG. 1 shows a sectional view schematically showing the magnetic disk of the invention.

The magnetic disk of the invention comprises a substrate 1, at least one recording layer 2 formed on the substrate 1, a protective layer 3 on the recording layer 2 and a lubricant layer 4 formed thereon, as an outermost layer, which contains the compound of the invention.

The substrate 1 is composed of aluminum alloy, glass and like ceramics, polycarbonate or the like.

The recording layer of the magnetic disk, i.e., the magnetic layer is composed of mainly elements capable of forming ferromagnetic bodies, such as iron, cobalt or nickel, alloy or oxide containing chromium, platinum or tantalum in addition to such elements. These materials are applied by, e.g., a plating method or a sputtering method.

The protective layer is formed of carbon, SiC, $SiO_2$ or the like. The layer is formed by a sputtering method or CVD method.

The lubricant composition of a mixture of compound (A) and compound (B) is applied in the form of a film to magnetic disks by the dip process or vacuum deposition process, whereby the magnetic disks are made to have a lubricant film which is highly resistant to decomposition and has a balance between adhesion and mobility. The dip process is a process comprising diluting the lubricant in a solvent, dipping the disk into the solution, thereafter withdrawing the disk from the solution and evaporating the solvent to form a lubricant film over the disk. Examples of useful solvents are PF-5060, PF-5080, HFE-7100 and HFE-7200 which are products of 3M, Vertrel-XF, product of DuPont, etc. The lubricant composition of the invention to be applied to magnetic disk surfaces by the dip process is up to 1 wt. %, preferably 0.001 to 0.1 wt. %, in the concentration of the compound as diluted. The dilute solution to be used is a solution containing both the compound (A) and compound (B). The mixing ratio is such that the proportion of the compound (A) is 30 to 70 wt. %, preferably 40 to 60 wt. %. The proportion of the compound (B) is 30 to 70 wt. %, preferably 40 to 60 wt. %. Alternatively, a dilute solution may be prepared from each of the compounds, for example, to coat the disk with the compound (A) and thereafter apply the compound (B) by the dip process. The order of application of the two compounds may be reversed.

The lubricant of compound (A) and the lubricant of compound (B) may be in form of two superposed layers. The lubricant layers may be in an island-sea pattern, or a mixture of island and sea patterns.

The lubricant film of the present invention is preferably 5 to 30 angstroms, more preferably 8 to 20 angstroms, in thickness.

To enable the lubricant to adhere to the ground layer with a promoted effect, heat treatment or ultraviolet treatment can be conducted. The heat treatment is conducted at 60 to 150° C., preferably at 80 to 120° C. The ultraviolet treatment is conducted, with use of ultraviolet rays which are 172 nm to 254 nm in wavelength.

[2-2] Application

The magnetic disk of the invention can be applied to a magnetic disk apparatus which can accommodate the disk and which is provided with a magnetic disk drive including a head for recording, reproducing and erasing information and a motor for rotating the disk; and with a control system for controlling the drive.

The magnetic disk of the invention and the magnetic disk apparatus produced using the magnetic disk thereof can be applied for the following: electronic computers, and outer memories for word processors; and can be also applied in navigation systems, games, cellular phone, PHS (personal handyphone system) and like instruments and machines and inner and outer memories for prevention of crimes in buildings, and for management/control systems of power plants.

BRIEF DESCRIPTION OF THE DRAWING

FIG. 1 is a section view showing the structure of the magnetic disk of the invention. Indicated at 1 is a substrate; at 2, a recording layer; at 3, a protective layer; and at 4, a lubricant layer.

BEST MODE FOR CARRYING OUT THE INVENTION

The invention will be described in more detail with reference to the following examples and test examples to which, however, the invention is not limited.

The compounds (1) to (4) were used for preparing lubricant films on disks for evaluation.

Compound (1) is a compound of the formula (7) having an average molecular weight of 2000.

Compound (2) is a compound of the formula (7) having an average molecular weight of 4000.

Compound (3) is a compound of the formula (8) having an average molecular weight of 2000.

Compound (4) is a compound of the formula (9) having an average molecular weight of 2000.

Example 1

Compound (1) and compound (3) were dissolved in Vertrel-XF, product of DuPont. The solution contained 0.025 wt. % of compound (1) and 0.025 wt. % of compound (3). Magnetic disks 3.5 inches in diameter were dipped into the solution for 1 minute and withdrawn at a rate of 3 mm/s. The disks were thereafter placed into a constant-temperature chamber of 120° C. for 10 minutes to promote the adhesion of the lubricant to the disk surfaces. When subsequently measured by FT-IR, the lubricant films on the disks were 13 angstroms in average thickness. In this way, lubricant films of this example were obtained.

Example 2

Lubricant films of this examples were prepared in the same manner as in Example 1 with the exception of using compound (2) in place of compound (1). The lubricant films formed were 14 angstroms in average thickness.

Example 3

Compound (2) was dissolved in Vertrel-XF, product of DuPont at a concentration of 0.05 wt. %. Magnetic disks 3.5 inches in diameter were dipped into the solution for 1 minute and withdrawn at a rate of 3 mm/s. The disks were thereafter placed into a constant-temperature chamber of 120° C. for 10 minutes to promote the adhesion of the lubricant to the disk surfaces. The disks were thereafter immersed in Vertrel-XF, product of DuPont for 10 minutes and withdrawn at a rate of 5 mm/s. When subsequently measured by FT-IR, the lubricant films on the disks were 7 angstroms in average thickness.

Subsequently, compound (3) was dissolved in Vertrel-XF, product of DuPont at a concentration of 0.05 wt. %. The disks having the 7-angstrom-thick lubricant comprising compound (2) and prepared as above were dipped into this solution for 1 minute and withdrawn at a rate of 5 mm/s. When thereafter measured by FT-IR, the lubricant films on the disks were 13 angstroms in average thickness. In this way, lubricant films of this example were obtained.

Comparative Example 1

Lubricant films of this example were prepared in the same manner as in Example 1 with the exception of using a 0.05 wt. % solution of compound (3) in place of the solution of mixture of compound (1) and compound (3). The lubricant films formed were 12 angstroms in average thickness.

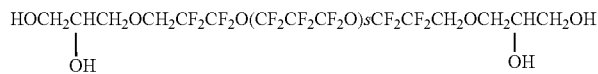

(7)

wherein s is 11 in the case of compound (1), or s is 23 in compound (2).

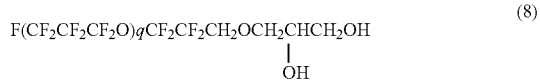

(8)

wherein q is 12.

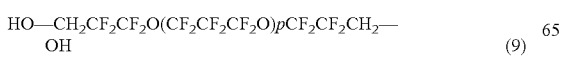

(9)

wherein p is 11.

Comparative Example 2

Lubricant films of this example were prepared in the same manner as in Example 1 with the exception of using a 0.08 wt. % solution of compound (4) in place of the solution of mixture of compound (1) and compound (3). The lubricant films formed were 12 angstroms in average thickness.

Experimental Example 1

Contact Start-Stop Test

The lubricant was tested for performance with use of a spindle stand which was so modified as to measure the coefficient of friction from the force acting on the head, by repeatedly subjecting the spindle stand to contact start-stop (CSS) in an environment of 20° C. for the measurement of variations in the coefficient of friction due to the repeated testing. One CSS cycle, taking 33 seconds, was initiated with the head brought into contact with the disk surface, followed by a predetermined number of revolutions of 10000 rpm with the head levitated. The cycle was thereafter terminated upon the disk coming to a halt upon the contact of the head with the disk surface. The head was monolithic MIG (metal in gap) with a load of 7.5 g. The acceptability evaluated by the CSS test was determined in terms of the number of cycles (CSS life) resulting in a break of the head and disk (crushing).

Table 1 shows the results. The present invention provides a lubricant film for use on magnetic disks which comprises in combination a perfluoropolyether compound (A) having a main-chain structure highly resistant to decomposition and a polar group at each end of the molecule thereof, and a perfluoropolyether compound (B) having a nonpolar group at at least one terminal of the molecule thereof. Table 1 reveals that the lubricant film exhibits remarkably outstanding CSS durability that is about 2 to 15 times higher than the corresponding durability of the compound as used singly in Comparative Example 1 or 2.

TABLE 1

| Specimen | CSS durability [cycle] |
| --- | --- |
| Example 1 | at least 50000 |
| Example 2 | at least 50000 |
| Example 3 | at least 50000 |
| Comparative Example 1 | 26000 |
| Comparative Example 2 | 3300 |

While the present invention provides a lubricant layer for use on magnetic disks which comprises in combination a compound (A) having a main-chain structure of $(CF_2CF_2CF_2O)$ and a polar group at each end of the molecule thereof, and a compound (B) having a nonpolar group at at least one terminal of the molecule thereof, the foregoing results indicate that the lubricant exhibits outstanding durability without decomposition or spattering for use with high-speed rotation disks and low-flying heads, owing to the decomposition resistance of the lubricant itself and the balance between adhesion and mobility.

INDUSTRIAL APPLICABILITY

The present invention provides a lubricant layer for use on magnetic disks which comprises in combination a perfluoropolyether compound having a main-chain having excellent resistance to decomposition and a polar group at each end of the molecule thereof, and a perfluoropolyether compound having a nonpolar group at at least one terminal of the molecule thereof, the lubricant layer exhibiting outstanding durability without decomposition or spattering for use with high-speed rotation disks and low-flying heads.

The invention claimed is:

1. A magnetic disk having at least a recording layer and a protective layer formed on a substrate, and a lubricant layer over a surface thereof, the magnetic disk having a lubricant layer comprising a compound (A) and, a lubricant layer comprising a compound (B), wherein the compound (A) is

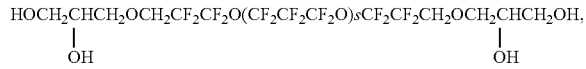

and wherein s is 11 or 23, and
wherein the compound (B) is

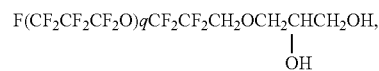

and wherein q is 12.

* * * * *